Dec. 17, 1957     J. BJORKSTEN     2,816,322
PIPELAYING METHOD
Filed July 23, 1954     3 Sheets-Sheet 1
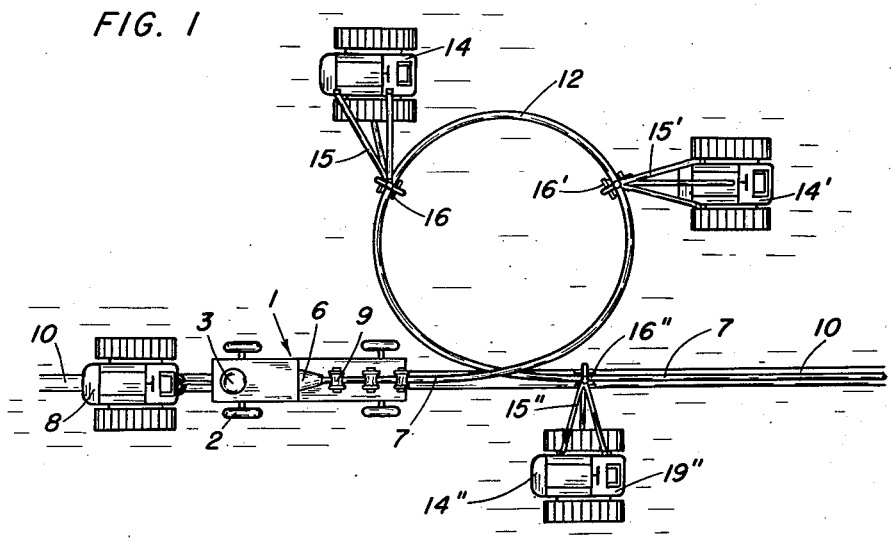
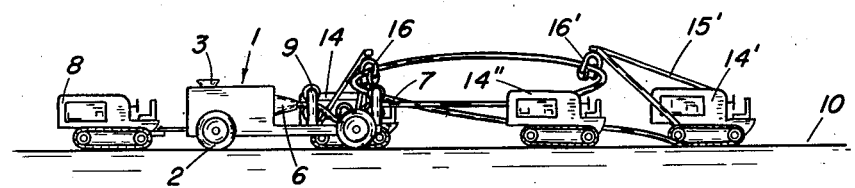
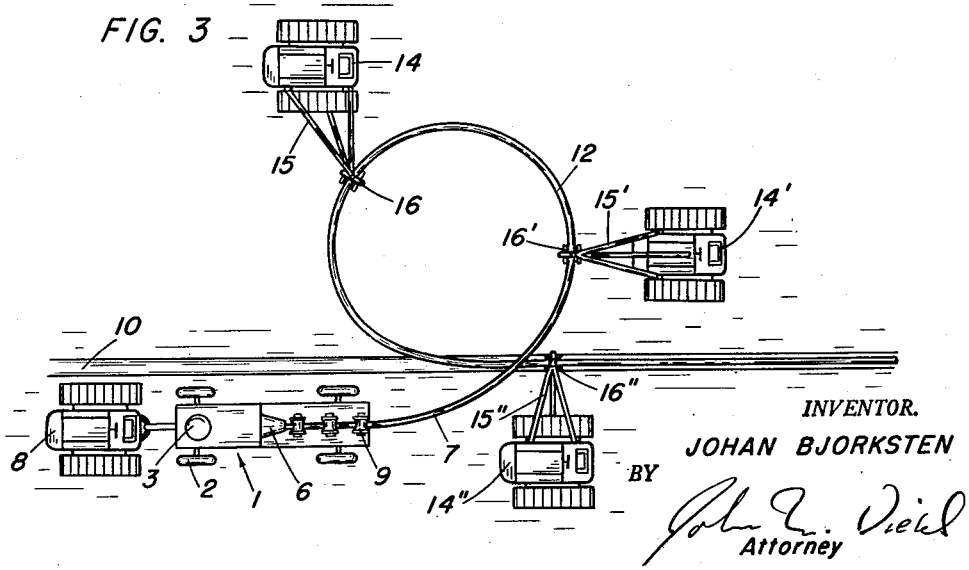
INVENTOR.
JOHAN BJORKSTEN
BY
*Attorney*

Dec. 17, 1957   J. BJORKSTEN   2,816,322
PIPELAYING METHOD
Filed July 23, 1954   3 Sheets-Sheet 2

INVENTOR.
JOHAN BJORKSTEN
BY
Attorney

Dec. 17, 1957  J. BJORKSTEN  2,816,322
PIPELAYING METHOD

Filed July 23, 1954  3 Sheets-Sheet 3

INVENTOR.
JOHAN BJORKSTEN
BY
Attorney

United States Patent Office 2,816,322
Patented Dec. 17, 1957

2,816,322

PIPELAYING METHOD

Johan Bjorksten, Madison, Wis.

Application July 23, 1954, Serial No. 445,274

12 Claims. (Cl. 18—47.5)

This invention relates to the art of laying of pipe, particularly pipe of relatively large diameters for transportation of liquids in quantity, such as for example water, petroleum oils, gasoline, fuel oils, milk and any other liquid commodity handled in quantity.

Heretofore, it has been the practice to lay such pipe in short lengths. Usually these pieces have been of ferrous metal and only a few feet long, and have been welded together as the pipe was laid. Furthermore, the pipe then had to be brushed clean, wound with a protective covering of impregnated paper, additionally impregnated with asphalt, and finally tested for completeness of the coating coverage and precision of the weld, before being placed permanently in the ground. All of this has resulted in making the laying of such pipe a very slow and tedious operation; particularly the fact that the pipe is welded together so as to have seams every few feet provides numerous opportunities for leakage or damage to the pipe or for metallurgical conditions conducive to corrosion.

The present invention contemplates a radical departure from precedent in the art of laying pipelines, in that the pipe is made as it is laid, in that the pipe is continuous, without any seams, in that the pipe is made of a plastic material having much lighter specific gravity than metal, in that it is not necessary to transport pipe sections containing air because the material is transported in bulk and the pipe is formed as it is laid, and finally, in that the operations of testing seams, winding, corrosion proofing, coating, and checking of the pipe are eliminated.

An object of my invention is therefore an improved method of laying pipe.

Another object is a method for laying pipe continuously.

Further objects will become apparent from the drawings and the following detailed description in which it is my intention to describe embodiments illustrating the applicability of the device without thereby being limited to less than the scope of all those equivalents which will be apparent to those skilled in the art, and in which like reference numerals refer to like parts, and in which:

Figure 1 is a plan view from above showing the operation of one embodiment;

Figure 2 is a side view showing the operation of the same embodiment.

Figure 3 is a plan view showing the operation of the embodiment in a slightly different mode;

Figure 4:
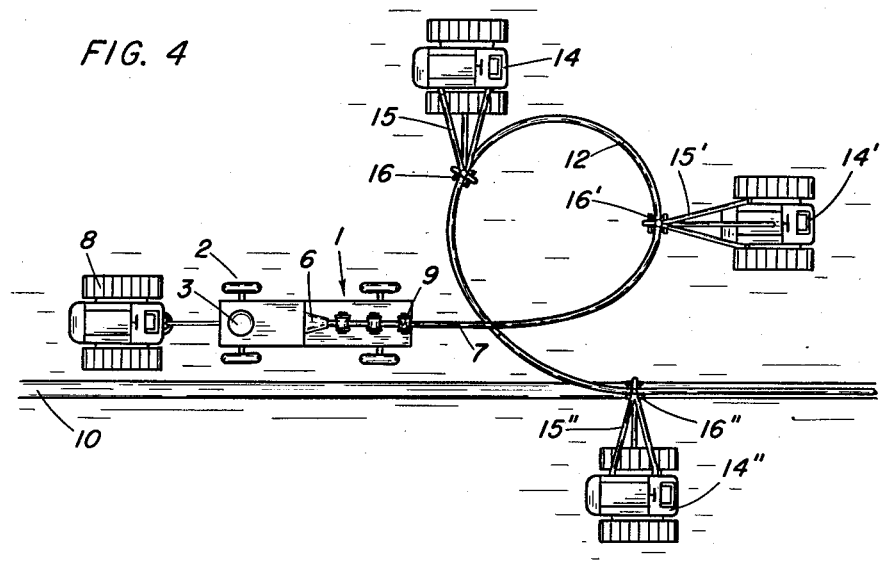
Figure 4 is a plan view showing the operation of the same embodiment in yet another mode.

In accordance with my invention, a screw-type or other extruder mounted on wheels or continuous treads travels along said trench continuously extruding synthetic resin pipe into the trench and thus continuously laying pipe as it emerges from the extruder, the rate of forward travel being approximately equal to the rate of extrusion of the pipe.

In the figures, an extruder indicated generally as 1 is mounted on wheels 2 and is provided with hopper 3 which is filled with thermoplastic synthetic resin. The device may be provided with a steam generator for heating the extrusion nozzle 6 and other parts of extruder 1. The same object may be accomplished, in other embodiments, by any suitable heating method such as, for example, a heat transfer liquid or an electric heating system. Pipe 7 of thermoplastic synthetic resin is continually extruded from nozzle 6, as the device moves along the trench being pulled by tractor 8.

The pipe is pulled from extrusion nozzle 6 by pull rolls 9 of the sort usually utilized to pull continuously extruded synthetic resin tubing and extruded shapes from extrusion nozzle dies. The pull rolls turn at a speed adapted to provide a rate of extrusion substantially equal to that at which tractor 8 travels along or over trench 10.

As disclosed in application Serial No. 213,993, now Patent No. 2,718,684, filed March 5, 1951, of which this is a continuation-in-part application and in such patents as 1,084,158 issued to H. E. Marsh; 1,309,878 issued to John H. Carr; and 952,488 issued to J. L. Wiggins, it has heretofore been proposed to extrude synthetic resin pipe and concrete pipe respectively directly into a trench with a machine traveling over the trench. Such machines have proved impractical in many instances due to the difficulty of providing for exactly the same speed in the machine traveling above the trench as is provided within the extruder, that is, because of the variable height (roughness) of the ground on which the machine travels there results a variable distance between the extruded nozzle and any fixed point in the bottom of the ditch. There is a varying rate of change in this distance instead of the constant rate of change which would correspond to the continuous rate of drawing at a standard extruder nozzle. Furthermore in standard extrusion procedures it is necessary to provide air pressure within the pipe, downstream of the extrusion nozzle, said air pressure being sealed in by a quantity of liquid contained in a bend in the pipe formed by passing the pipe over one roll, under a second roll and over a third roll. The present device thus permits the utilization of conventional extruding procedure in order to obtain the desired quality of synthetic resin pipe and at the same time permits the pipe to be placed into the trench without the usual steps which would have been necessary and required heretofore of cutting the pipe into lengths as it leaves the extruder and then transporting these lengths to the scene of operations and rejoining the lengths to form subsequently a continuous pipe containing a large number of joints, each of which provides possibility of future failure.

As shown in Figures 1 and 2, pipe 7 leaving extruder 1 is formed into a loop 12, substantially in a plane generally horizontal with respect to the ground and supported in place by three tractors 14, 14' and 14" carrying booms 15, 15' and 15" and swivel sheaves 16, 16' and 16" of the type conventional in the oil industry. Loop 12 provides the equivalent of an expansion joint and allows tractor 8 to travel along the trench 10 at a rate which from time to time may vary considerably from the rate of extrusion at nozzle 6, but which can be controlled easily to provide an overall rate of travel corresponding exactly to the rate of extrusion. This is permitted by loop 12 which acts as an expansion joint. As tractor 8 pulls slightly ahead, loop 12 becomes slightly smaller. As tractor 8 lags slightly behind the rate of extrusion at nozzle 6, loop 12 becomes slightly larger.

As shown in Figures 3 and 4, the tractor and extruder may travel along one side of the trench or along the other side of the trench rather than straddling the trench.

Figure 5:
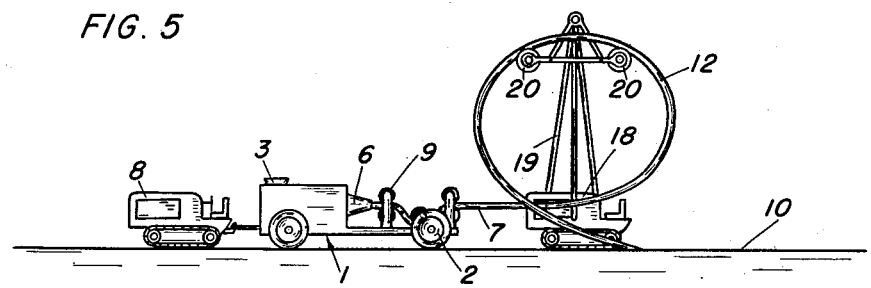
Figure 5 is a side view showing another mode for operating the device.

In Figure 5 it is shown that the loop may be provided vertically and may be supported in place by a boom 19 extending vertically upward from tractor 18 and carrying, suspended from its apex, sheaves 20. The system shown in Figure 5 has the advantage of requiring only one tractor to support loop 12, loop 12 being supported substantially in a plane vertical to the surface of the ground.

Figure 6:
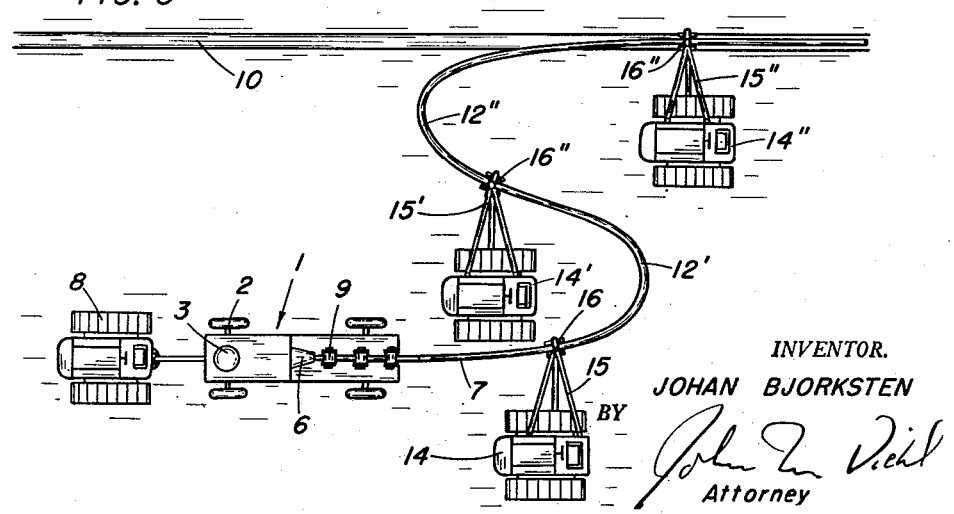
Figure 6 is a plan view showing yet another mode of operation.

In Figure 6 there is shown another embodiment of the operation in which the pipe 7 is supported in a zigzag or S curve comprising two bends 12' and 12" instead of the single loop 12. The bends 12' and 12" serve the same function as loop 12 in providing room for the length of pipe between the end of pull rolls 9 and the point at which the pipe is laid in the ditch to increase or decrease in relatively substantial amounts from minute to minute as the laying of the pipe progresses.

Figure 7:
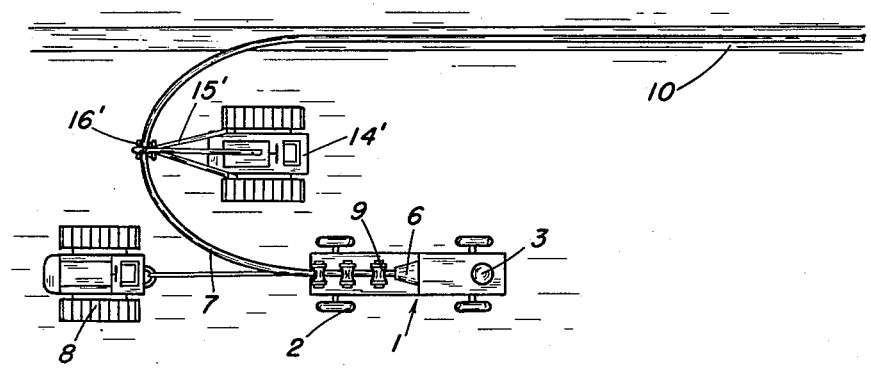
Figure 7 is a plan view showing still another mode of operation.

In Figure 7 there is shown another embodiment in which pipe 7 is extruded forwardly from the moving extruder indicated generally as 1' and is supported in a forwardly extending 180° bend by tractor 14' carrying boom 15' and sheave 16'. The digging of trench 10 may be accomplished entirely apart from the pipe-laying operation or in another embodiment, not shown, it may be done by a plow member or trench-digger mounted on the extruder device or pulled ahead of the extruder by the tractor 8.

The pipe may consist of any extrudable synthetic resin, such as, for example, polyesters, polyethylene, polystyrene, copolymers of styrene and butadiene, copolymers of styrene and other monomers, sulfone-olefin resins, polyvinylidene chloride, copolymers of vinylidene chloride and vinyl chloride, copolymers of vinyl chloride and vinyl acetate, nylon resins, and the like. The resin may contain reinforcing fibers of glass. Polyethylene and polyesters and vinyl chloride polymers are preferred.

The resin for fabricating the pipe is brought to the extruder by truck, railroad car or other suitable means and hopper 3 is periodically filled, to provide a continuous supply of material for the extruder. Thus the pipe is produced and laid in the ground in one continuous length, interrupted only where it is necessary that a branch line T, pump, or booster pump be installed. Such fittings and connections may be made by flanges and clamping devices or other means well known to the art.

The order of magnitude envisaged in this invention is illustrated by some of the requirements to be met in laying a 32-inch outer diameter pipe having walls one inch thick. Assuming polyethylene or a closely related polymer to be the thermoplastic synthetic resin used, one mile of pipe would weigh 203,000 pounds. To heat this amount of this material to the extrusion temperature, approximately 36.5 million B. t. u.'s are required. To furnish this amount of heat approximately 14,320 horsepower hours are needed and to produce this amount of horsepower hours, two tons of fuel per mile of pipe are required, operating with equipment having 50% efficiency in the combustion and heat transfer processes.

The invention relates to laying pipe over long distances and is scarcely useful for a pipe having a length of less than 200 yards and would preferably be used for pipe having a length of at least one mile. The invention provides pipe of these lengths and of far greater lengths, entirely devoid of any seam, joint or connection whatsoever.

It is fully realized that this invention is capable of modifications and variations, and it is intended to include in this invention such modifications, so that the invention is to be limited only by the claims in which it is my intention to cover all novelty inherent therein as broadly as possible, in view of prior art.

Having thus disclosed by invention, I claim:

1. The process of continuously laying into a trench synthetic resin pipe substantially without joints, comprising the steps of causing a movable extruder to pass parallel to a trench, causing synthetic resin tubing to be extruded from said extruder, causing the pipe to bend at least 180° between the point of leaving said extruder and the point of entering said trench, said bend being supported by means adapted to travel along the ground and to move substantially parallel to said trench and substantially in conjunction with said extruder.

2. The process of continuously laying into a trench synthetic resin pipe substantially without joints, comprising the steps of causing a movable extruder to pass parallel to a trench, causing synthetic resin tubing to be extruded backwardly from said extruder, causing the pipe to loop between the point of leaving said extruder and the point of entering said trench, said loop being supported by means adapted to travel along the ground and to move substantially parallel to said trench and substantially in conjunction with said extruder.

3. The process of continuously laying into a trench pipe comprising synthetic resin substantially without joints, comprising the steps of causing a movable pipe-making machine to pass parallel to a trench, causing pipe comprising synthetic resin to be substantially continuously made and to pass out backwardly from said machine, causing said pipe to bend at least 180° between the point of leaving said machine and the point of entering said trench, said bend being supported by means adapted to travel along the ground and to move substantially parallel to said trench and substantially in conjunction with said machine.

4. The process of continuously laying into a trench pipe comprising synthetic resin substantially without joints, comprising the steps of causing a movable pipe-making machine to pass parallel to a trench, causing pipe comprising synthetic resin to be substantially continuously made and to pass out backwardly from said machine, causing the pipe to loop between the point of leaving said machine and the point of entering said trench, said loop being supported by means adapted to travel along the ground and to move substantially parallel to said trench and substantially in conjunction with said machine.

5. The process of continuously laying synthetic resin pipe substantially without joints, comprising the steps of causing a movable extruder to pass parallel to a position on the ground adapted to receive a pipe, causing synthetic resin pipe to be extruded from said extruder, causing the pipe to bend at least 180° between the point of leaving said extruder and the point of introduction to said position, said bend being supported by means traveling substantially parallel to the path of said extruder and substantially in conjunction with said extruder.

6. The process of continuously laying synthetic resin pipe substantially without joints, comprising the steps of causing a movable extruder to pass parallel to a position on the ground adapted to receive a pipe, causing synthetic resin pipe to be extruded backwardly from said extruder, causing the pipe to loop between the point of leaving said extruder and the point of introduction to said position, said loop being supported by means traveling substantially parallel to the path of said extruder and substantially in conjunction with said extruder.

7. The process of continuously laying pipe comprising synthetic resin substantially without joints, comprising the steps of causing a movable pipe-making machine to pass parallel to a position on the ground adapted to receive a pipe, causing pipe comprising synthetic resin to be substantially continuously made and to pass out backwardly from said machine, causing said pipe to bend at least 180° between the point of leaving said machine and the point of introduction to said position, said bend being supported by means traveling substantially parallel to the path of said machine and substantially in conjunction with said machine.

8. The process of continuously laying pipe comprising synthetic resin substantially without joints, comprising the steps of causing a movable pipe-making machine to pass parallel to a position on the ground adapted to receive a pipe, causing pipe comprising synthetic resin to be substantially continuously made and to pass out backwardly from said machine, causing the pipe to loop between the point of leaving said machine and the point of introduction to said position, said loop being supported by means traveling substantially parallel to the path of said machine and substantially in conjunction with said machine.

9. The process of continuously laying synthetic resin pipe substantially without joints, comprising the steps of causing a movable extruder to travel substantially parallel to a final position for pipe, causing synthetic resin pipe to be extruded from said extruder, causing the pipe to bend at least 180° between the point of leaving said extruder and the point of introduction to said final position, said bend being supported by means traveling substantially parallel to final position of said pipe and substantially in conjunction with said extruder.

10. The process of continuously laying synthetic resin pipe substantially without joints, comprising the steps of causing a movable extruder to travel substantially parallel to a final position for pipe, causing synthetic resin pipe to be extruded backwardly from said extruder, causing the pipe to loop between the point of leaving said extruder and the point of introduction to said final position, said loop being supported by means traveling substantially parallel to the final position of said pipe and substantially in conjunction with said extruder.

11. The process of continuously laying pipe comprising synthetic resin substantially without joints, comprising the steps of causing a movable pipe-making machine to travel substantially parallel to a final position for pipe, causing pipe comprising synthetic resin to be substantially continuously made and to pass out backwardly from said machine, causing said pipe to bend at least 180° between the point of leaving said machine and the point of introduction to said final position, said bend being supported by means traveling substantially parallel to said final position of said pipe, and substantially in conjunction with said machine.

12. The process of continuously laying pipe comprising synthetic resin substantially without joints, comprising the steps of causing a movable pipe-making machine to travel substantially parallel to a final position for pipe, causing pipe comprising synthetic resin to be substantially continuously made and to pass out backwardly from said machine, causing the pipe to loop between the point of leaving said machine and the point of introduction to said final position, said loop being supported by means traveling substantially parallel to said final position of said pipe and substantially in conjunction with said machine.

References Cited in the file of this patent

UNITED STATES PATENTS

| | | |
|---|---|---|
| 2,118,553 | Garlinger | May 24, 1938 |
| 2,167,971 | Cadden | Aug. 1, 1939 |
| 2,605,202 | Reynolds | July 29, 1952 |
| 2,662,271 | Greenberger | Dec. 15, 1953 |
| 2,672,297 | Harder | Mar. 16, 1954 |

UNITED STATES PATENT OFFICE

CERTIFICATE OF CORRECTION

Patent No. 2,816,322                                 December 17, 1957

Johan Bjorksten

It is hereby certified that error appears in the printed specification of the above numbered patent requiring correction and that the said Letters Patent should read as corrected below.

Column 3, line 45, after "T," insert --valve,--.

Signed and sealed this 11th day of February 1958.

(SEAL)
Attest:
KARL H. AXLINE
Attesting Officer

ROBERT C. WATSON
Commissioner of Patents